US012421019B2

(12) United States Patent
Bellamah et al.

(10) Patent No.: US 12,421,019 B2
(45) Date of Patent: Sep. 23, 2025

(54) OPENING PACK

(71) Applicant: Altria Client Services LLC, Richmond, VA (US)

(72) Inventors: Stephen Bellamah, Richmond, VA (US); Daniel Richter, Richmond, VA (US)

(73) Assignee: ALTRIA CLIENT SERVICES LLC, Richmond, VA (US)

( * ) Notice: Subject to any disclaimer, the term of this patent is extended or adjusted under 35 U.S.C. 154(b) by 0 days.

(21) Appl. No.: 18/397,181

(22) Filed: Dec. 27, 2023

(65) Prior Publication Data

US 2024/0124217 A1 Apr. 18, 2024

Related U.S. Application Data

(63) Continuation of application No. 18/056,792, filed on Nov. 18, 2022, now Pat. No. 11,858,720, which is a continuation of application No. 17/136,079, filed on Dec. 29, 2020, now Pat. No. 11,511,931, which is a continuation of application No. 16/165,191, filed on Oct. 19, 2018, now Pat. No. 10,926,943.

(51) Int. Cl.

| | |
|---|---|
| ***B65D 85/10*** | (2006.01) |
| *B31B 50/26* | (2017.01) |
| *B31B 110/35* | (2017.01) |
| *B31B 120/30* | (2017.01) |

(52) U.S. Cl.
CPC ..... *B65D 85/1036* (2013.01); *B65D 85/1018* (2013.01); *B31B 50/26* (2017.08); *B31B 2110/35* (2017.08); *B31B 2120/302* (2017.08); *B31B 2241/003* (2013.01)

(58) Field of Classification Search
CPC .. B65D 5/38; B65D 85/1036; B65D 85/1018; B65D 85/10; B65D 85/1054; B31B 50/26; B31B 2120/302; B31B 2110/35; B31B 2241/003
USPC ....... 206/249, 251, 252, 265, 266, 268, 271, 206/273; 229/87.14, 160.1
See application file for complete search history.

(56) References Cited

U.S. PATENT DOCUMENTS 1,007,113 A * 10/1911 Kazian .................... A24F 15/12 206/755
1,192,707 A * 7/1916 Thorndike .............. A24F 15/12 206/251

(Continued)

FOREIGN PATENT DOCUMENTS

CH 598061 A5 4/1978
CN 2069398 U 1/1991

(Continued)

*Primary Examiner* — Luan K Bui
(74) *Attorney, Agent, or Firm* — Harness, Dickey & Pierce, P.L.C.

(57) ABSTRACT

In an example embodiment, a pack for tobacco articles comprises an inner sleeve, and an outer box comprising front and back covers that allow access to the inner sleeve when the outer box is opened. The inner sleeve can include a front connecting panel pivotally connecting a front wall of the inner sleeve to an inner surface of the front cover and a back connecting panel pivotally connecting a back wall of the inner sleeve to an inner surface of the back cover. A slot in the outer box is configured to allow opening of the outer box by applying pressure against a bottom wall of the inner sleeve.

20 Claims, 8 Drawing Sheets

(56) References Cited

U.S. PATENT DOCUMENTS

| | | | | |
|---|---|---|---|---|
| 3,052,398 | A | 9/1962 | Benjamin | |
| 3,058,646 | A | 10/1962 | Guyer | |
| 3,102,675 | A | 9/1963 | Schrom | |
| 3,132,790 | A | 5/1964 | Capuccio | |
| 3,311,283 | A | 3/1967 | Shimada | |
| 3,881,599 | A | 5/1975 | Flaherty | |
| 4,240,548 | A | 12/1980 | Stio | |
| 4,588,081 | A * | 5/1986 | Newsome | B65D 85/1036 229/122.34 |
| 4,641,748 | A | 2/1987 | Lewis et al. | |
| 5,174,492 | A * | 12/1992 | Gero | B65D 5/5213 229/128 |
| 7,681,727 | B2 * | 3/2010 | Hunt | B65D 85/1009 206/268 |
| 7,900,770 | B2 | 3/2011 | Tawada et al. | |
| 7,992,708 | B2 * | 8/2011 | Hein | B65D 85/1054 206/251 |
| 8,464,867 | B2 | 6/2013 | Holloway et al. | |
| 8,550,241 | B2 | 10/2013 | Holford | |
| 8,556,071 | B2 | 10/2013 | Holloway et al. | |
| 8,992,708 | B2 | 3/2015 | Schumacher et al. | |
| 9,687,026 | B2 | 6/2017 | Clark et al. | |
| 9,738,412 | B1 | 8/2017 | Victor | |
| 2008/0087712 | A1 | 4/2008 | Hunt et al. | |
| 2017/0258130 | A1 | 9/2017 | Clark et al. | |
| 2018/0022503 | A1 | 1/2018 | Waddington | |
| 2019/0062023 | A1 | 2/2019 | Lantz et al. | |

FOREIGN PATENT DOCUMENTS

| | | | |
|---|---|---|---|
| CN | 2883238 | Y | 3/2007 |
| CN | 101472803 | A | 7/2009 |
| CN | 202449424 | U | 9/2012 |
| DE | 1285948 | B | 12/1968 |
| DE | 4315345 | A1 | 12/1994 |
| EP | 2038191 | A1 | 3/2009 |
| EP | 2995562 | A1 | 3/2016 |
| ES | 2396786 | A1 | 2/2013 |
| GB | 1263203 | A | 2/1972 |
| WO | WO-94/01331 | A1 | 1/1994 |
| WO | WO-94/26625 | A1 | 11/1994 |
| WO | WO-2006061563 | A1 | 6/2006 |
| WO | WO-2007029471 | A1 | 3/2007 |
| WO | WO-2007029527 | A1 | 3/2007 |
| WO | WO-2008006471 | A1 | 1/2008 |
| WO | WO-2013170975 | A1 | 11/2013 |
| WO | WO-2015186089 | A1 | 12/2015 |

* cited by examiner

OPENING PACK

CROSS-REFERENCE TO RELATED APPLICATIONS

The present invention is a continuation patent application of U.S. patent application Ser. No. 18/056,792, filed Nov. 18, 2022, which is a continuation patent application of U.S. patent application Ser. No. 17/136,079, filed Dec. 29, 2020, which is a continuation patent application of U.S. patent application Ser. No. 16/165,191, filed Oct. 19, 2018, the entire contents of each of which is incorporated herein in its entirety by reference.

FIELD OF THE INVENTION

The present invention relates to a hand held container and in particular to a pack for consumer articles, such as for example and without limitation, tobacco articles, smoking articles, pouches, cigars, or any other types of articles.

BACKGROUND

Smoking articles such as cigarettes and a variety of other consumer goods are commonly sold in hinge-lid containers having a body portion and a lid portion, which is hinged to the body portion. In conventional hinge-lid cigarette packs, the lid portion of the pack is hinged to the top of the rear wall of the body portion thereof along a transverse hinge line and the cigarettes stand in the body portion of the upright pack. When the consumer opens the pack, by pivoting the front of the lid portion up and to the rear, the upper ends of the cigarettes standing in the body portion are exposed, while in the closed position, the front wall, rear wall and side walls of the lid portion of the hinge-lid pack form vertical extensions of the corresponding walls of the body portion thereof.

It would be desirable for a pack of consumer goods to be opened and closed using new designs.

SUMMARY

According to an example embodiment, a pack for smoking articles includes an outer box including front and back covers pivotally connected together at bottom ends thereof such that top ends of the front and back covers are movable from a closed position to an open position, an inner sleeve including a bottom wall, a front wall, and a back wall, a front connecting panel pivotally connected to the front wall of the inner sleeve and to an inner surface of the front cover, a back connecting panel pivotally connected to the back wall of the inner sleeve and to an inner surface of the back cover, and a slot in the outer box configured to allow pressing against the bottom wall of the inner sleeve to move the inner sleeve from a first position to a second position, wherein moving the inner sleeve from the first position to the second position causes the top ends of the front and back covers to move from the closed position to the open position.

According to an example embodiment, the outer box is made of paperboard.

According to an example embodiment, the inner sleeve is made of paperboard.

According to an example embodiment, the front connecting panel is pivotally connected to the inner surface of the front cover by being pivotally connected to an end panel that is attached to the inner surface of the front cover.

According to an example embodiment, the back connecting panel is pivotally connected to the inner surface of the back cover by being pivotally connected to an end panel that is attached to the inner surface of the back cover.

According to an example embodiment, the front connecting panel is pivotally connected to the inner surface of the front cover by being pivotally connected to a first end panel that is attached to the inner surface of the front cover, and the back connecting panel is pivotally connected to the inner surface of the back cover by being pivotally connected to a second end panel that is attached to the inner surface of the back cover.

According to an example embodiment, the front and back covers are pivotally connected together at bottom ends thereof via a bottom wall that is connected to a back wall of the back cover and that is pivotally connected to a front wall of the front cover.

According to an example embodiment, the slot includes an opening in the bottom wall that extends into an opening in the back wall.

According to an example embodiment, the slot includes an opening in part of the bottom wall and part of the back wall.

According to an example embodiment, the front cover includes a front wall and three sidewalls forming a rectangular shaped front recess facing the back cover, and the back cover includes a back wall and three sidewalls forming a rectangular shaped back recess facing the front cover, and a bottom wall of the outer box is connected to the front wall of the front cover and to the back wall of the back cover.

According to an example embodiment, a distance between the front wall of the front cover and the back wall of the back cover when the front and back covers are in the closed position is greater than a depth of the front recess, is greater than a depth of the back recess, or is greater than the depth of the front recess and is greater that the depth of the back recess.

According to an example embodiment, a distance between the front wall of the front cover and the back wall of the back cover when the front and back covers are in the closed position is greater than a distance between the front wall of the front cover and a beginning of the front recess.

According to an example embodiment, a distance between the front wall of the front cover and the back wall of the back cover when the front and back covers are in the closed position is greater than a distance between the back wall of the back cover and a beginning of the back recess.

According to an example embodiment, the slot includes an opening in the bottom wall of the outer box.

According to an example embodiment, the slot further includes an opening in a lower portion of the back wall of the back cover that extends from the opening in the bottom wall of the outer box.

According to an example embodiment, the three sidewalls of the front cover at least partly fit inside the three sidewalls of the back cover when the front and back covers are in the closed position.

According to an example embodiment, the front and back covers are also movable from the open position to the closed position.

According to an example embodiment, about 25% to about 75% of the three sidewalls of the front cover fit inside the three sidewalls of the back cover when the front and back covers are in the closed position.

According to an example embodiment, a click lock is configured to assist in holding the front and back covers in the closed position.

According to an example embodiment, a click lock is configured to provide a clicking sound when the front and back covers are moved from the open position to the closed position.

According to an example embodiment, the front cover includes a tab configured to engage a transverse slot in the back cover when the front and back covers are moved from the open position to the closed position.

According to an example embodiment, the pack includes a wrapped bundle of smoking articles, the wrapped bundle having a length greater than a length between the bottom wall of the inner sleeve and an opening of the inner sleeve, the wrapped bundle mounted for movement in the inner sleeve such that the wrapped bundle is inside the outer box when the front and back covers are in the closed position and the wrapped bundle can be accessed when the front and back covers are in the open position.

According to an example embodiment, the pack includes a wrapped bundle of smoking articles, the wrapped bundle mounted for movement in the inner sleeve such that the wrapped bundle is inside the outer box when the front and back covers are in the closed position and a free end of the wrapped bundle extends past one or both of the top ends of the front and back covers when the front and back covers are in the open position.

According to an example embodiment, the outer box comprises a folded paperboard outer box blank and the inner sleeve comprises a folded paperboard inner sleeve blank, the inner sleeve blank including the bottom wall, the front wall, the back wall, and the front and back connecting panels.

According to an example embodiment, the inner sleeve blank further includes a first end panel pivotally connected to the front connecting panel along a transverse fold line, the first end panel adhered to the inner surface of the front cover thereby pivotally connecting the front connecting panel to the inner surface of the front cover, and a second end panel pivotally connected to the back connecting panel along a transverse fold line, the second end panel adhered to the inner surface of the back cover, thereby pivotally connecting the back connecting panel to the inner surface of the back cover.

According to an example embodiment, the inner sleeve blank further includes a first sidewall connected to one side of the front wall along a first longitudinal fold line, a second sidewall connected to an opposite side of the front wall along a second longitudinal fold line, a third sidewall connected to one side of the back wall along a third longitudinal fold line, and a fourth sidewall connected to an opposite side of the back wall along a fourth longitudinal fold line.

According to an example embodiment, the inner sleeve blank further includes a first end flap connected to one side of the bottom wall along a fifth longitudinal fold line, and a second end flap connected to an opposite side of the bottom wall along a sixth longitudinal fold line.

According to an example embodiment, the inner sleeve further includes a first reinforcing strap connected to one side of the front connecting panel along a seventh longitudinal fold line, a second reinforcing strap connected to an opposite side of the front connecting panel along an eighth longitudinal fold line, a third reinforcing strap connected to one side of the back connecting panel along a ninth longitudinal fold line, a fourth reinforcing strap connected to an opposite side of the back connecting panel along a tenth longitudinal fold line, the sidewalls of the front panel overlapping the sidewalls of the back panel, the first and second end flaps overlapping lower portions of the sidewalls, the first and second reinforcing straps overlapping each other and the third and fourth reinforcing straps overlapping each other.

According to an example embodiment, the first and third sidewalls overlap, and the second and fourth sidewalls overlap.

According to an example embodiment, the first and third sidewalls overlap, a first part of the first end flap overlaps the first sidewall, the third sidewall, or both the first sidewall and the third sidewall, a second part of the first end flap overlaps the back wall, and a third part of the first end flap overlaps the front wall.

According to an example embodiment, the second and fourth sidewalls overlap, a first part of the second end flap overlaps the second sidewall, the fourth sidewall, or both the second sidewall and the fourth sidewall, a second part of the second end flap overlaps the back wall, and a third part of the second end flap overlaps the front wall.

According to an example embodiment, the first and second reinforcing straps overlap and the third and fourth reinforcing straps overlap.

According to an example embodiment, the outer box blank comprises a back inner end panel with a transverse slot therein, a back outer end panel connected to the back inner end panel along a first transverse fold line, a back panel connected to the back outer end panel along a second transverse fold line, a bottom panel connected to the back panel along a third transverse fold line, a front panel connected to the bottom panel along a fourth transverse fold line, a front outer end panel connected to the front panel along a fifth transverse fold line, and a front inner end panel connected to the front outer end panel along a sixth fold line, the front outer end panel including a tab extending therefrom, the tab engaging the transverse slot of the back inner end panel when the front and back covers are in the closed position.

According to an example embodiment, the outer box blank includes an opening in the bottom panel that extends into the back panel, the opening forming the slot in the outer box.

According to an example embodiment, the outer box blank includes a first sidewall connected to one side of the front panel along a first longitudinal fold line, a second sidewall connected to an opposite side of the front panel along a second longitudinal fold line, a third sidewall connected to one side of the back panel along a third longitudinal fold line, and a fourth sidewall connected to an opposite side of the back panel along a fourth longitudinal fold line, the bottom panel having a length in the longitudinal direction greater than a width of the sidewalls in the transverse direction.

According to an example embodiment, the tab is configured to make a clicking sound when the front and back covers are moved from the open position into the closed position.

According to an example embodiment, pressing against the bottom wall of the inner sleeve moves the inner sleeve from the first position to the second position to thereby move the front and back covers from the closed position to the open position can be done while holding the pack with one hand and pressing against the bottom wall with a finger of the hand.

According to an example embodiment, a pack for tobacco articles comprises an outer box including front and back covers pivotally connected together via a bottom wall that is connected to a back wall of the back cover and that is pivotally connected to a front wall of the front cover such that top ends of the front and back covers are movable from a closed position to an open position, an inner sleeve including a bottom wall, a front wall, and a back wall, a front connecting panel pivotally connected to the front wall of the inner sleeve and to an inner surface of the front cover, a back connecting panel pivotally connected to the back wall of the inner sleeve and to an inner surface of the back cover, and a slot in the outer box configured to allow moving the top ends of the front and back covers from the closed position to the open position by pressing against the bottom wall of the inner sleeve through the slot.

BRIEF DESCRIPTION OF THE DRAWINGS

FIGS. 1A-F are perspective views of a container according to some example embodiments, wherein FIG. 1A shows a closed container embodiment resting on a support surface, FIG. 1B shows a closed container embodiment held in a hand prior to opening, FIG. 1C shows how a container embodiment can be opened while gripping sides of the container and using finger pressure, FIG. 1D shows another view of how a container embodiment can be opened while gripping ends of the container and using thumb pressure, FIG. 1E shows a closed container embodiment, and FIG. 1F shows a closed container embodiment from a different angle.

DETAILED DESCRIPTION

Figure 1A:
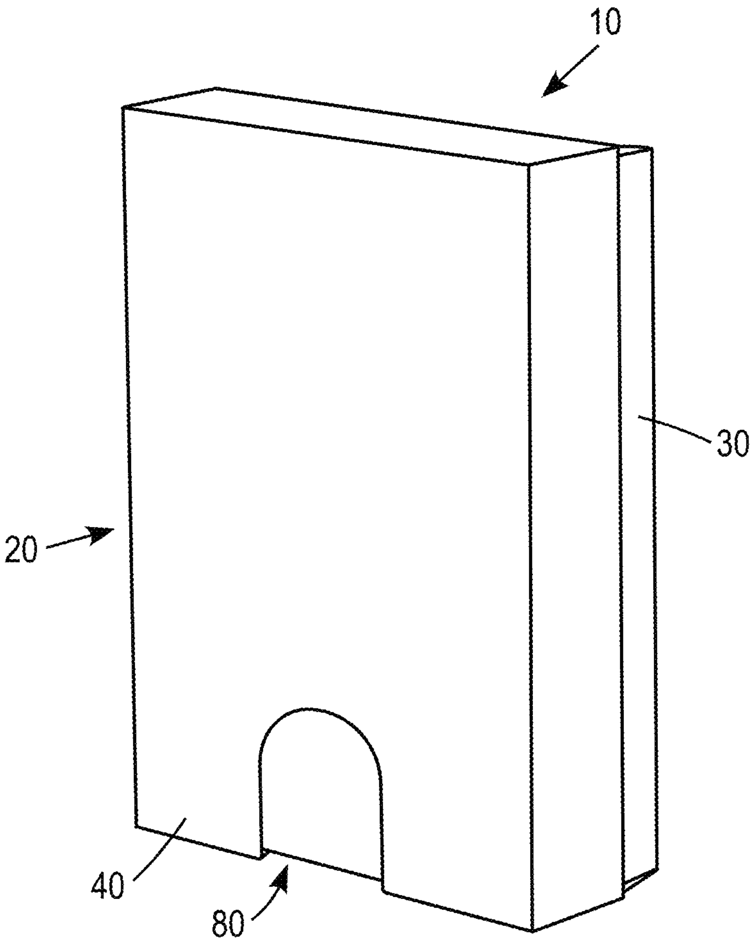
Figure 1B:
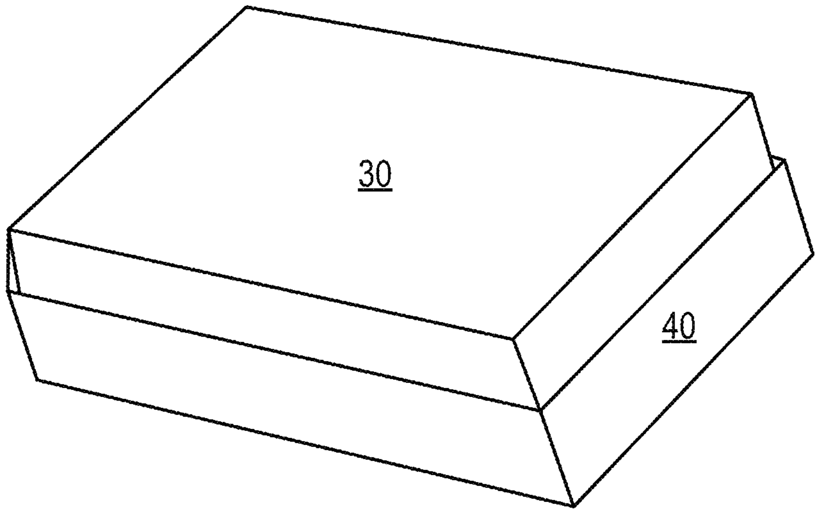
Figure 1C:
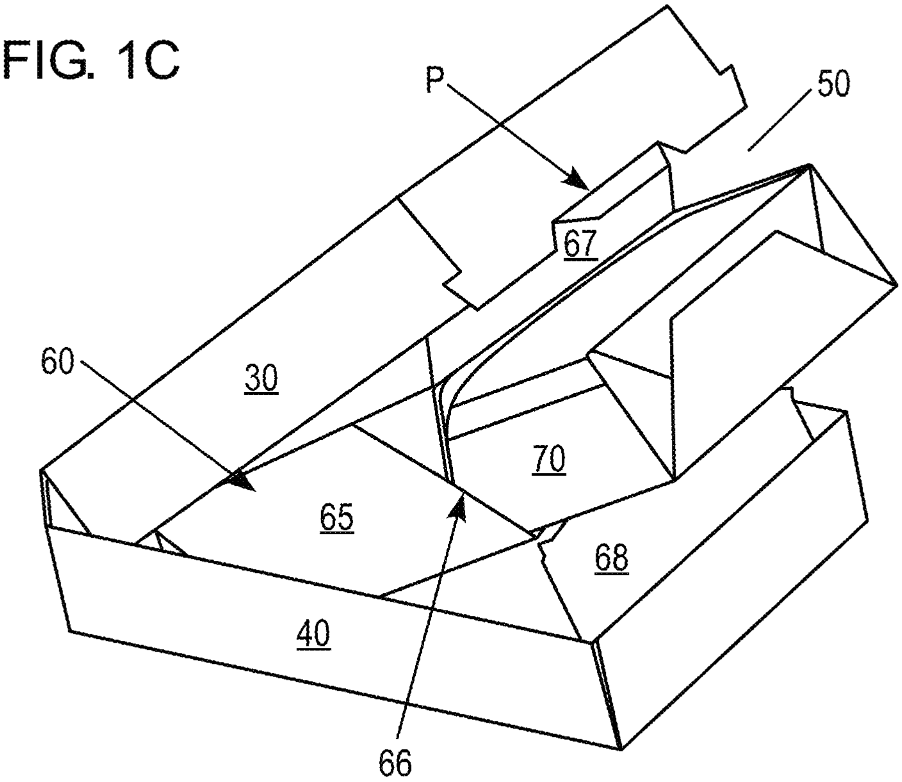
Figure 1D:
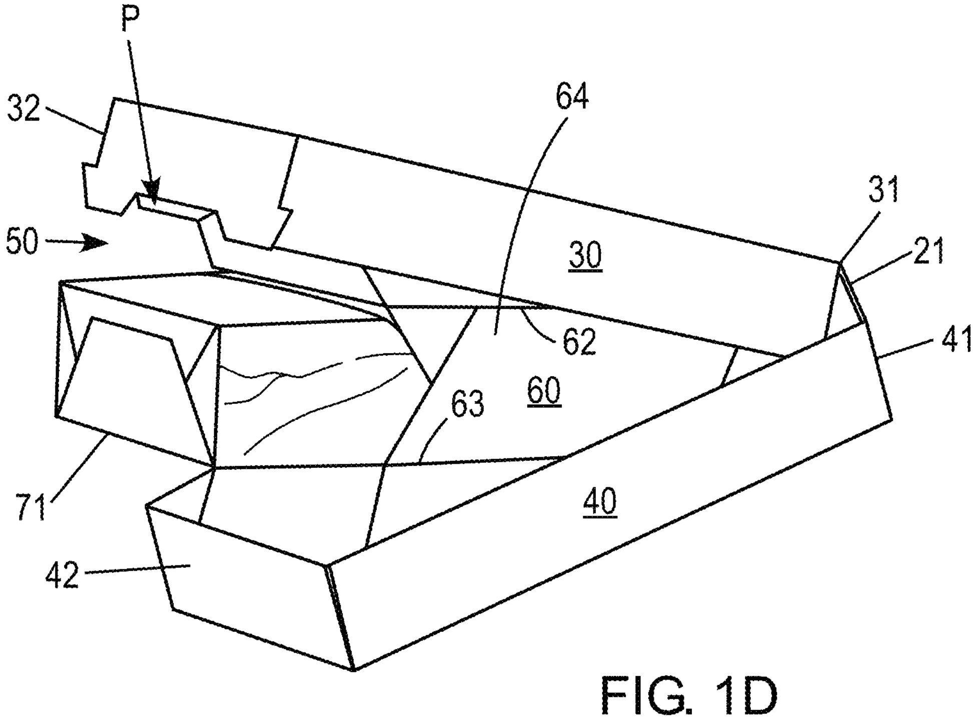
Figure 1E:
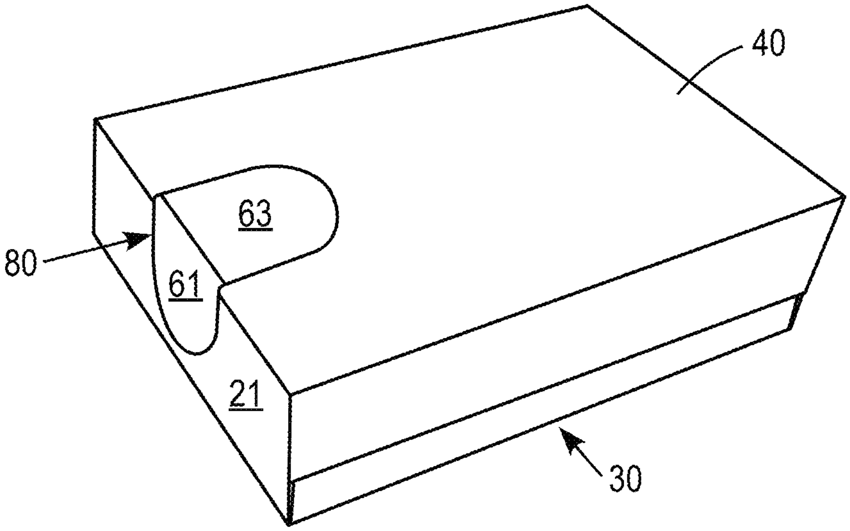
Figure 1F:
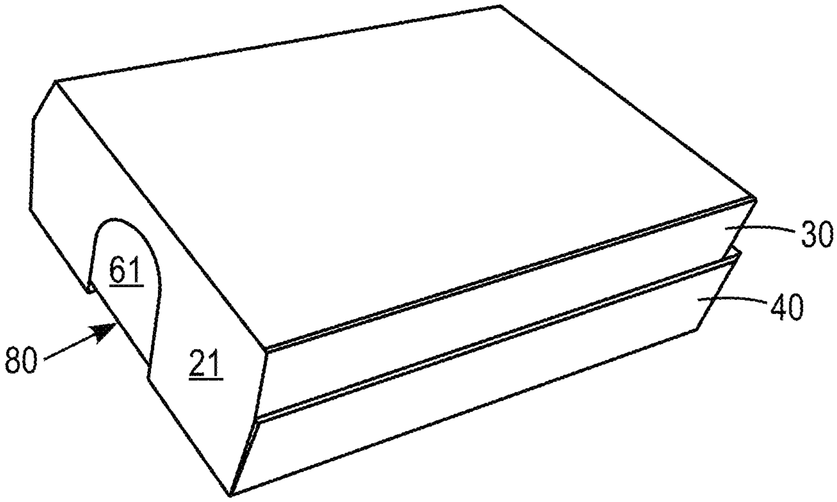

FIGS. 1A-F are perspective views of a container as described herein according to some example embodiments, wherein FIG. 1A shows a closed container embodiment resting on a support surface, FIG. 1B shows a closed container embodiment held in a hand prior to opening, FIG. 1C shows how a container embodiment can be opened while gripping sides of the container and using finger pressure, FIG. 1D shows another view of how a container embodiment can be opened while gripping ends of the container and using thumb pressure, FIG. 1E shows a closed container embodiment resting on a support surface, and FIG. 1F shows a closed container embodiment resting on a support surface.

According to some example embodiments, a pack 10 for consumer articles, including for example and without limitation smoking articles, comprises an outer box 20 comprising a front cover 30 and a back cover 40 pivotally connected together at bottom ends 31, 41 thereof such that top ends 32, 42 of the front and back covers 30, 40 are movable from a closed position (see FIGS. 1A-B, E-F) to an open position (see FIGS. 1C-D) at which the top ends 32, 42 of the front and back covers 30, 40 move apart to form an access opening 50. In some example embodiments, outer box 20 can be made of paperboard material, including, for example and without limitation, 12 to 14 point paperboard material (in other examples, less than 12 point or greater than 14 point paperboard material may be used), and in some example embodiments may be laminated or coated with a metalized layer and/or polymer layer.

According to some example embodiments, an inner sleeve 60 is configured to hold consumer articles inside the pack 10. The inner sleeve 60 includes a bottom wall 61, a front wall 62, a back wall 63 and opposed sidewalls 64, 65, and a top opening 66 configured to receive a wrapped bundle 70 of consumer articles. A front connecting panel 67 is pivotally connected to the front wall 62 of the inner sleeve 60 and one or more inner surfaces of the front cover 30 (in some example embodiments, front connecting panel 67 is pivotally connected to the one or more inner surfaces of the front cover 30 by being pivotally connected to a panel 202 of an inner sleeve blank 200 used to form inner sleeve 60, and said panel 202 being attached to the one or more inner surfaces of front cover 30, thereby pivotally connecting front connecting panel 67 to the one or more inner surfaces of the front cover 30). A back connecting panel 68 is pivotally connected to the back wall 63 of the inner sleeve 60 and one or more inner surfaces of the back cover 40 (in some example embodiments, back connecting panel 68 is pivotally connected to the one or more inner surfaces of the back cover 40 by being pivotally connected to a panel 214 of an inner sleeve blank 200 used to form inner sleeve 60, and said panel 214 being attached to the one or more inner surfaces of back cover 40, thereby pivotally connecting back connecting panel 68 to the one or more inner surfaces of the back cover 40). A finger slot 80 in the outer box 20 is configured to allow opening of the outer box 20 by finger pressure against the bottom wall 61 of the inner sleeve 60 to move the inner sleeve 60 from a first position at which the outer box 20 is closed, to a second position at which at which the top ends 32, 42 of the front and back covers 30, 40 are moved apart to form the access opening 50. In some example embodiments, the opening may be done with one hand. In some example embodiments, sleeve 60 can be made of paperboard material, including, for example and without limitation, 12 to 14 point paperboard material (in other examples, less than 12 point or greater than 14 point paperboard material may be used), and in some example embodiments may be laminated or coated with a metalized layer and/or polymer layer. Different materials, including materials other than paperboard material, may be used for sleeve 60. Different materials, including materials other than paperboard material, may be used for outer box 20 and/or for sleeve 60. Examples of materials that may be used for an outer box 20 and/or for a sleeve 60 include paperboard, cardboard, plastic and any other suitable materials that may be used to create outer boxes, inner sleeves, and packs disclosed herein.

The pack 10 can include various optional design features according to various example embodiments. For example, the outer box 20 can include a bottom wall 21 connected to the front and back covers 30, 40, the front cover 30 can include a front wall 35 and three sidewalls 36*a*, 36*b*, 36*c* forming a rectangular shaped front recess facing the back cover 40, the back cover 40 can include a back wall 45 and three sidewalls 46*a*, 46*b*, 46*c* forming a rectangular shaped back recess facing the front cover 30, and the bottom wall 21 of the outer box 20 can extend between a lower end of the front wall 35 of the front cover 30 and a lower end of the back wall 45 of the back cover 40.

The pack 10 can have any desired dimensions depending on the length and/or size of the articles to be contained within the pack. For example, in some example embodiments, the bottom wall 21 of the outer box 20 can be taller than each of the three sidewalls 36*a*, 36*b*, 36*c* of the front cover 30, and can be taller than each of the three sidewalls 46*a*, 46*b*, and 46*c* of the back cover 40. The pack can be pocket sized and dimensioned to hold various length smoking articles. For example and without limitation, for 80-85 mm long smoking articles, the pack 10, when closed, can have a length of about 90-95 mm, a width of about 55-65 mm, and a depth of about 20-30 mm. Any other dimensions may be used depending on the length and/or size of the articles to be contained within the pack. In some example embodiments, the pack can be pocket sized and/or dimensioned to hold various sized articles.

Figure 2:
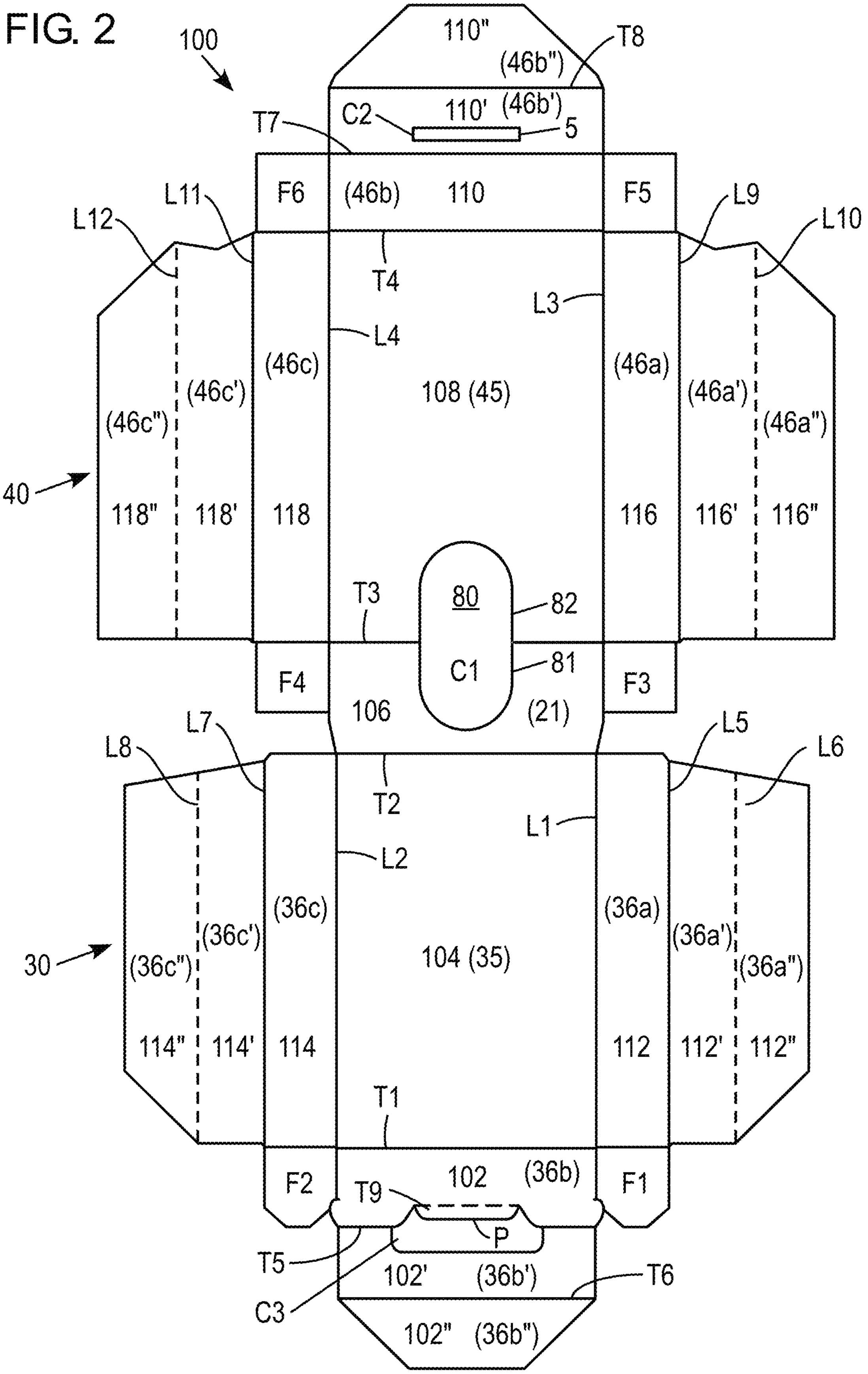
FIG. 2 shows an outer box blank which can be used to construct an outer box of a pack according to some example embodiments.

Finger slot 80 can have any desired configuration. For example, the finger slot 80 can comprise an opening 81 in the bottom wall 21 of the outer box 20. In some example embodiments, the finger slot 80 can optionally include an opening 82 in a lower portion of the back wall 45 of the back cover 40 wherein the opening 82 extends from the opening 81 in the bottom wall 21 of the outer box 20 (for example, as shown in FIG. 2 and in assembled form in FIG. 1E). Outer box 20 may also be opened by simply pulling apart front and back covers 30 and 40, and thus in some example embodiments finger slot 80 may be omitted.

The outer box 20 can have various design features. For example, sidewalls 36*a*, 36*b* and 36*c* of the front cover 30 can be designed to fit inside sidewalls 46*a*, 46*b* and 46*c* of the back cover 40, either in whole or in part, when the front and back covers 30, 40 are in a closed position (as shown, for example in FIGS. 1A, 1B, 1E and 1F). For example, the sidewalls can be designed such that sidewalls 36*a*, 36*b* and 36*c* of the front cover 30 fit entirely inside sidewalls 46*a*, 46*b* and 46*c* of the back cover 40 when the front and back covers 30, 40 are in a closed position. The sidewalls can be also designed such that the sidewalls 36*a*, 36*b* and 36*c* of the front cover 30 only partially fit inside sidewalls 46*a*, 46*b* and 46*c* of the back cover 40 when the front and back covers 30, 40 are in a closed position. For example and without limitation, in various example embodiments the sidewalls can be designed such that about 25% to about 75% of sidewalls 36*a*, 36*b* and 36*c* of the front cover 30 fit inside sidewalls 46*a*, 46*b* and 46*c* of the back cover 40 when the front and back covers 30, 40 are in a closed position. Other designs and dimensions may be used in other example embodiments, such as designs where less than 25% or more than 75% of the sidewalls 36*a*, 36*b* and 36*c* of the front cover 30 fit inside sidewalls 46*a*, 46*b* and 46*c* of the back cover 40 when the front and back covers 30, 40 are in a closed position A pack 10 can optionally include an audible locking feature in some example embodiments. For example, the pack can include a click lock feature configured to provide a "clicking" sound when the front and back covers 30, 40 are moved into the closed position as will be further described below. In some embodiments, this feature may also assist in holding the front and back covers 30, 40 in a closed position.

The pack 10 can be used to hold consumer items such as smoking articles or any other type of consumer items. For example, in some embodiments, a wrapped bundle 70 of articles can be located in the inner sleeve 60, and wherein the wrapped bundle 70 has a length greater than a length between the bottom wall 61 and top opening 66 of the inner sleeve 60, greater than a length between the bottom wall 61 and the front connecting panel 67, and/or greater than a length between the bottom wall 61 and the back connecting panel 68. The inner sleeve 60 can be mounted for movement in the outer box 20 such the wrapped bundle 70 is inside the outer box 20 when the front and back covers 30, 40 are in a closed position, and a free end 71 of the wrapped bundle 70 moves toward, and in some example embodiments extends outward of, the access opening 50 when the front and back covers 30, 40 are opened. The wrapped bundle 70 can house a bundle of consumer articles. In some example embodiments, the wrapped bundle 70 can house a bundle of cigarettes or other smoking articles, tobacco articles, pouches, cigars, or any other type of articles, in some example embodiments the articles being wrapped in a soft wrapping or reclosable pouch made of any suitable material such as, for example and without limitation, paper, a laminate of paper, foil, metal foil, metalized paper, and/or any other suitable material.

The outer box 20 and inner sleeve 60 can be made of various materials. For example, the outer box 20 can comprise a folded paperboard outer box blank 100 and the inner sleeve 60 can comprise a folded paperboard inner sleeve blank 200 wherein the inner sleeve blank 200 includes the front and back connecting panels 67, 68. Different materials, including materials other than paperboard material, may be used for outer box 20 and/or for sleeve 60. Examples of other materials that may be used for an outer box 20 and/or for a sleeve 60 include cardboard, plastic and any other suitable materials that may be used to create outer boxes, inner sleeves, and packs disclosed herein.

In some example embodiments, an outer box blank 100 includes panels separated by transverse and longitudinal fold lines which allow the panels to be folded and form the front and back covers 30, 40. As shown in FIG. 2, in some example embodiments an outer box blank 100 can include a first panel 102 corresponding to side wall 36*b*, a second panel 104 (corresponding to front wall 35) separated from the first panel 102 by a transverse fold line T1, a third panel 106 (corresponding to the bottom wall 21) separated from the second panel 104 by a second transverse fold line T2, a fourth panel 108 (corresponding to the back wall 45) separated from the third panel 106 by a third transverse fold line T3, and a fifth panel 110 (corresponding to the sidewall 46*b*) separated from the fourth panel 108 by a fourth transverse fold line T4. A sixth panel 112 (corresponding to the sidewall 36*a*) is separated from a longitudinal end of the second panel 104 by a longitudinal fold line L1 and a seventh panel 114 (corresponding to sidewall 36*c*) is separated from the opposite longitudinal end of the second panel 104 by a second longitudinal fold line L2. An eighth panel 116 (corresponding to the sidewall 46*a*) is separated from a longitudinal end of the fourth panel 108 by a third longitudinal fold line L3 and a ninth panel 118 (corresponding to sidewall 46*c*) is separated from the opposite longitudinal end of the fourth panel 108 by a fourth longitudinal fold line L4.

In some example embodiments additional panels can be provided which can be folded to increase the thickness of side walls 36*a*, 36*b*, 36*c*, 46*a*, 46*b* and/or 46*c*, to increase structural rigidity of an outer box 20, and/or to adhere to other panels. For example, a first reinforcement panel 102' (36*b*') can be separated from the first panel 102 (corresponding to sidewall 36*b*) by a fifth transverse fold line T5 (in some example embodiments, fifth transverse fold line T5 may be interrupted by a cutout C3 as shown in FIG. 2 and will be further described below), and a second reinforcement panel 102" (36*b*") can be separated from the first reinforcement panel 102' by a sixth transverse fold line T6. When outer box blank 100 is folded to form outer box 20, the first reinforcement panel 102' can be folded over first panel 102, first panel 102 can be folded about fold line T1, and second reinforcement panel 102" can be folded about fold line T6 such that second reinforcement panel 102" and first reinforcement panel 102' form an L-shape, and second reinforcement panel 102" can be adhered to second panel 104. Likewise, a third reinforcement panel 110' (46*b*') can be separated from the fifth panel 110 (corresponding to sidewall 46*b*) by a seventh transverse fold line T7, and a fourth reinforcement panel 110" (46*b*") can be separated from the third reinforcement panel 110' by an eighth transverse fold line T8 (which may include one or more perforations (not shown) in some example embodiments). When outer box blank 100 is folded to form outer box 20, the third reinforcement panel 110' can be folded over fifth panel 110, fifth panel 110 can be folded about fold line T4, and fourth reinforcement panel 110" can be folded about fold line T8 such that fourth reinforcement panel 110" and third reinforcement panel 110' form an L-shape, and fourth reinforcement panel 110" can be adhered to fourth panel 108.

In some example embodiments, the sidewalls 36*a*, 36*c*, 46*a*, 46*c* can be reinforced in a similar manner as the sidewalls 36*b*, 46*b*. For example, a fifth reinforcement panel 112' (36*a*') can be separated from the sixth panel 112 (corresponding to sidewall 36*a*) by a fifth longitudinal fold line L5, and a sixth reinforcement panel 112" (36*a*") can be separated from the fifth reinforcement panel 112' by a sixth longitudinal fold line L6 (which may be perforated in some example embodiments). When outer box blank 100 is folded to form outer box 20, the fifth reinforcement panel 112' can be folded over sixth panel 112, sixth panel 112 can be folded about fold line L1, and sixth reinforcement panel 112" can be folded about fold line L6 such that sixth reinforcement panel 112" and fifth reinforcement panel 112' form an L-shape, and sixth reinforcement panel 112" can be adhered to second panel 104. Likewise, a seventh reinforcement panel 114' (36*c*') can be separated from the seventh panel 114 (corresponding to sidewall 36*c*) by a seventh longitudinal fold line L7, and an eighth reinforcement panel 114" (36*c*") can be separated from the seventh reinforcement panel 114' by an eighth longitudinal fold line L8 (which may be perforated in some example embodiments). When outer box blank 100 is folded to form outer box 20, the seventh reinforcement panel 114' can be folded over seventh panel 114, seventh panel 114 can be folded about fold line L2, and eighth reinforcement panel 114" can be folded about fold line L8 such that eighth reinforcement panel 114" and seventh reinforcement panel 114' form an L-shape, and eighth reinforcement panel 114" can be adhered to second panel 104.

A ninth reinforcement panel 116' (46*a*') can be separated from the eighth panel 116 (corresponding to sidewall 46*a*) by a ninth longitudinal fold line L9, and a tenth reinforcement panel 116" (46*a*") can be separated from the ninth reinforcement panel 116' by a tenth longitudinal fold line L10 (which may be perforated in some example embodiments). When outer box blank 100 is folded to form outer box 20, the ninth reinforcement panel 116' can be folded over eighth panel 116, eighth panel 116 can be folded about fold line L3, and tenth reinforcement panel 116" can be folded about fold line L10 such that tenth reinforcement panel 116" and ninth reinforcement panel 116' form an L-shape, and tenth reinforcement panel 116" can be adhered to fourth panel 108. Likewise, an eleventh reinforcement panel 118' (46*c*') can be separated from the ninth panel 118 (corresponding to sidewall 46*c*) by an eleventh longitudinal fold line L11, and a twelfth reinforcement panel 118" (46*c*") can be separated from the eleventh reinforcement panel 118' by a twelfth longitudinal fold line L12 (which may be perforated in some example embodiments). When outer box blank 100 is folded to form outer box 20, the eleventh reinforcement panel 118' can be folded over ninth panel 118, ninth panel 118 can be folded about fold line L4, and twelfth reinforcement panel 118" can be folded about fold line L12 such that twelfth reinforcement panel 118" and eleventh reinforcement panel 118' form an L-shape, and twelfth reinforcement panel 118" can be adhered to fourth panel 108.

In some example embodiments, flaps F1, F2, F3, F4, F5 and/or F6 can be provided on the panels corresponding to the sidewalls and bottom wall of the outer box 20 for additional reinforcement and/or rigidity. For example, a flap F1 may be separated from sidewall 36*a* by a transverse fold line, and can be folded about said fold line and inserted (and adhered in some embodiments) between first panel 102 and first reinforcement panel 102' when outer box blank 100 is folded to form outer box 20. As a further example, a flap F2 may be separated from sidewall 36*c* by a transverse fold line, and can be folded about said fold line and inserted (and adhered in some embodiments) between first panel 102 and first reinforcement panel 102' when outer box blank 100 is folded to form outer box 20. As a further example, a flap F3 may be separated from bottom wall 21 by a longitudinal fold line, and can be folded about said fold line and inserted (and adhered in some embodiments) between eight panel 116 and ninth reinforcement panel 116' when outer box blank 100 is folded to form outer box 20. As a further example, a flap F4 may be separated from bottom wall 21 by a longitudinal fold line, and can be folded about said fold line and inserted (and adhered in some embodiments) between ninth panel 118 and eleventh reinforcement panel 118' when outer box blank 100 is folded to form outer box 20. As a further example, a flap F5 may be separated from sidewall 46*a* by a transverse fold line, and can be folded about said fold line and inserted (and adhered in some embodiments) between fifth panel 110 and third reinforcement panel 110' when outer box blank 100 is folded to form outer box 20. As a further example, a flap F6 may be separated from sidewall 46*c* by a transverse fold line, and can be folded about said fold line and inserted (and adhered in some embodiments) between fifth panel 110 and third reinforcement panel 110' when outer box blank 100 is folded to form outer box 20.

In some example embodiments, a finger slot 80 can comprise a cutout C1, which may be completely located within third panel 106 (bottom panel 21), or can extend from the third panel 106 and into the fourth panel 108 (this may, for example, allow for pushing with a finger bottom wall 61 of the inner sleeve 60, while holding back cover 40, to move the inner sleeve 60 from a first position at which the outer box 20 is closed to a second position at which the front and back covers 30, 40 are moved apart to form the access opening 50, as shown for example in FIGS. 1C and 1D). When the outer box blank 100 is folded to form the outer box 20, the cutout C1 forms finger slot 80, including in some example embodiments, opening 81 in the bottom wall 21 that extends into opening 82 in the back wall 45, as shown, for example in FIG. 2 (blank 100) and FIG. 1E (blank 100 folded to form outer box 20, with inner sleeve 60 inside seen through slot 80).

In some example embodiments, a click lock feature for outer box 20 can be provided by additional cutouts in the outer box blank 100. For example, third reinforcement panel 110' (46*b*') can include a cutout C2 extending in a transverse direction to form a slot S configured to engage a projection P (also referred to as a tab P) on the first panel 102 (sidewall 36*b*). When the outer box blank 100 is folded to form the outer box 20, the slot S is located inside the back cover 40, the projection P is part of front cover 30. The first reinforcement panel 102' (36*b*') can include a cutout C3 extending into the first panel 102 (sidewall 36*b*) to form the projection P, such that projection P extends from first panel 102 (as shown, for example, in the example embodiment of FIG. 2).

The projection P is separated from the first panel 102 (sidewall 36*b*) by a ninth transverse fold line T9 (which may be perforated in some example embodiments), which allows the projection to bend outwardly away from the first panel 102 (sidewall 36*b*) as front and back covers 30, 40 of outer box 20 move from an open position to a closed position. When the outer box blank 100 is folded to form the outer box 20, the projection P can engage the slot S and create a "clicking" sound as projection P snaps into the slot S when front and back covers 30, 40 move from an open position to a closed position.

Figure 3:
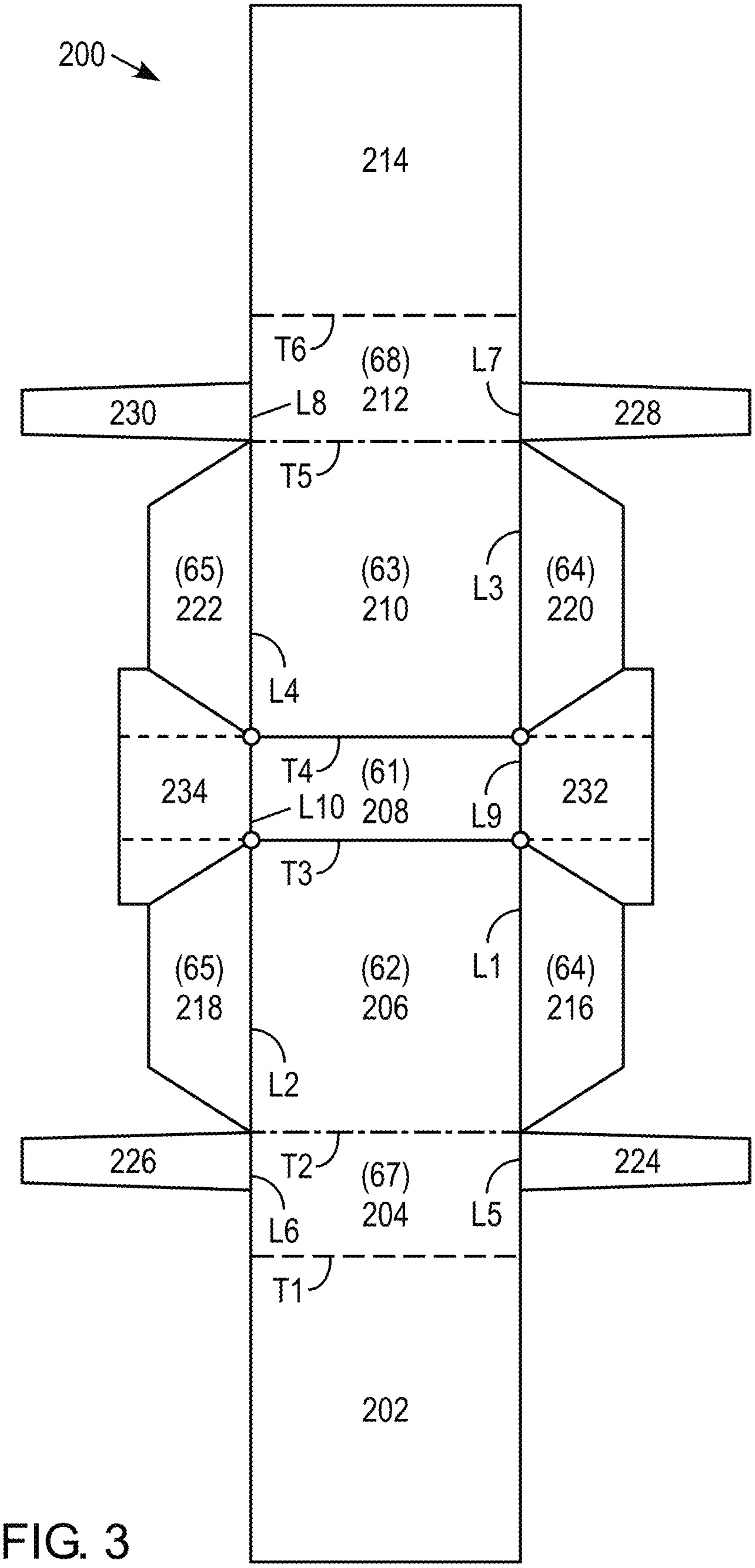
FIG. 3 shows an inner sleeve blank which can be used to construct an inner sleeve of a pack according to some example embodiments.

In some example embodiments, an inner sleeve blank 200 includes panels separated by transverse and longitudinal fold lines which allow the panels to be folded to form an inner sleeve 60. As shown in FIG. 3, an inner sleeve blank 200 can include a first panel 202 at one end (corresponding to a first end panel), a second panel 204 (corresponding to the front connecting panel 67) separated from the first panel 202 by a first transverse fold line T1 (which may be perforated in some example embodiments), a third panel 206 (corresponding to the front wall 62) separated from the second panel 204 by a second transverse fold line T2 (which may be perforated in some example embodiments), a fourth panel 208 (corresponding to the bottom wall 61) separated from the third panel 206 by a third transverse fold line T3, a fifth panel 210 (corresponding to the back wall 63) separated from the fourth panel 208 by a fourth transverse fold line T4, a sixth panel 212 (corresponding to the back connecting panel 68) separated from the fifth panel 210 by a fifth transverse fold line T5 (which may be perforated in some example embodiments), and a seventh panel 214 (corresponding to a second end panel) separated from the sixth panel 212 by a sixth transverse fold line T6 (which may be perforated in some example embodiments).

In some example embodiments, inner sleeve blank 200 includes an eighth panel 216 (corresponding to a sidewall 64) separated from one longitudinal side of the third panel 206 (corresponding to front wall 62) by a longitudinal fold line L1, a ninth panel 218 (corresponding to a sidewall 65) separated from the other longitudinal side of the third panel 206 by a second longitudinal fold line L2, a tenth panel 220 (corresponding to a second sidewall 64) separated from one longitudinal side of the fifth panel 210 (corresponding to back wall 63) by a third longitudinal fold line L3, and an eleventh panel 222 (corresponding to a second sidewall 65) separated from the other longitudinal side of the fifth panel 210 by a fourth longitudinal fold line L4.

In some example embodiments, inner sleeve blank 200 can include reinforcing panels 224, 226, 228 and/or 230. For example, a first reinforcing panel 224 can be separated from one side of the second panel 204 (corresponding to front connecting panel 67) by a fifth longitudinal fold line L5, a second reinforcing panel 226 can be separated from the other side of the second panel 204 by a sixth longitudinal fold line L6, a third reinforcing panel 228 can be separated from one side of the sixth panel 212 (corresponding to back connecting panel 68) by a seventh longitudinal fold line L7, and/or a fourth reinforcing panel 230 can be separated from the other side of the sixth panel 212 by an eighth longitudinal fold line L8. When the inner sleeve blank is folded to form the inner sleeve 60, the reinforcing panels 224, 226 can be overlapped and adhered to the second panel 204, and the reinforcing panels 228, 230 can be overlapped and adhered to the sixth panel 212.

Figure 4:
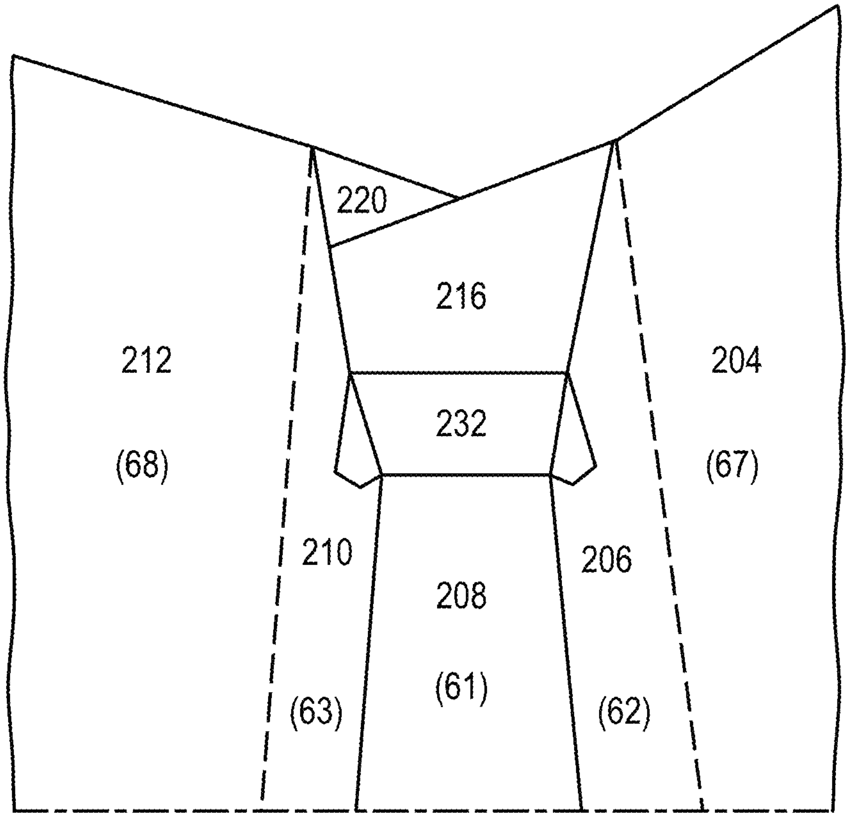
FIG. 4 shows a portion of an inner sleeve constructed from an inner sleeve blank according to some example embodiments.

In some example embodiments, the inner sleeve blank 200 can include flaps 232, 234 separated from the fourth panel 208 (bottom wall 61) by longitudinal fold lines L9, L10—flap 232 separated from one side of fourth panel 208 by longitudinal fold line L9, and flap 234 separated from an opposite side of the fourth panel 208 by longitudinal fold line L10. Eighth and tenth panels 216, 220 can be folded and adhered to each other, and ninth and eleventh panels 218, 222 can be folded and adhered to each other, to form a rectangular opening in the inner sleeve 60 for receipt of a bundle 70 (see, for example, opening 66 of FIG. 1C). In some example embodiments, flaps 232 and 234 can be trapezoid-shaped, each flap including a rectangular portion and two side triangular portions separated from the rectangular portion by fold lines that may be perforated, as shown for example in the example embodiment of FIG. 3 (other shapes may be used for the flaps, including for the side portions, in other embodiments that include flaps, and certain embodiments may not include flaps). In some example embodiments, when the inner sleeve blank 200 is folded to form inner sleeve 60, flap 232 can be folded such that the rectangular portion of 232 is adhered to an inner surface of panel 216 and/or panel 220 to form part of one of the sidewalls of the inner sleeve 60, and the side portions of the flap can be folded (and adhered in some embodiments) to inner surfaces of panel 206 and panel 210 (an example of this is shown, for example, in FIG. 4). Similarly, when the inner sleeve blank 200 is folded to form inner sleeve 60, flap 234 can be folded such that the rectangular portion of 234 is adhered to an inner surface of panel 218 and/or panel 222 to form part of the other sidewall of the inner sleeve 60, and the side portions of the flap can be folded (and adhered in some embodiments) to inner surfaces of panel 206 and panel 210.

As noted in example embodiments of the inner sleeve blank 200 and outer box blank 100, one or more of the fold lines may include one or more perforations. While this is shown in some figures and/or was mentioned in some example embodiments for some of the fold lines, any one of the fold lines can include one or more perforations, which in some cases may facilitate folding. In other example embodiments, the perforations can be omitted from the fold lines.

An assembled inner sleeve 60 can be incorporated in an assembled outer box 20 in some example embodiments by attaching the first and seventh panels 202, 214 of the inner sleeve blank 200 to inside surfaces of outer box 20, including, for example, attaching panel 202 to an inside surface of front wall 35 of front cover 30, and attaching panel 214 to an inside surface of back wall 45 of back cover 40. In some example embodiments, panel 202 may also or alternatively be attached to sixth reinforcement panel 112", to eight reinforcement panel 114" and/or to second reinforcement panel 102". In some example embodiments, panel 214 may also or alternatively be attached to tenth reinforcement panel 116", to twelfth reinforcement panel 118" and/or to fourth reinforcement panel 110". With panels 202, 214 attached to inside surfaces of front and back covers 30, 40, respectively, of the outer box 20, the inner sleeve 60 (and bundle 70 if a bundle is located in the sleeve 60) is confined inside the outer box 20 when the front and back covers 30, 40 are in a closed position. When the top ends of the front and back covers 30, 40 are moved apart to form an access opening 50, the inner sleeve 60 (and bundle 70 if a bundle is located in the sleeve 60) is moved towards the access opening 50 (in some example embodiments, a portion of a bundle 70 can move past the access opening 50). Thus, in example embodiments, inner sleeve blank 200 can include a panel 202 which can be adhered to one or more inside surfaces of front cover 30, and inner sleeve blank 200 can include a panel 214 which can be adhered to one or more inside surfaces of back cover 40.

In some example embodiments of an outer box blank 100 and an outer box 20, a distance between transverse fold lines T2 and T3 is greater than a distance between longitudinal fold lines L1 and L5, is greater than a distance between longitudinal fold lines L2 and L7, and/or is greater than a distance between transverse fold lines T1 and T5. In some example embodiments, a distance between transverse fold lines T2 and T3 is greater than a distance between longitudinal fold lines L3 and L9, is greater than a distance between longitudinal fold lines L4 and L11, and/or is greater than a distance between transverse fold lines T4 and T7.

In an example embodiment of a pack 10, front and back covers 30, 40 of an outer box 20 can be moved from a closed position to an open position by applying finger pressure through a finger slot 80 and pressing against a bottom wall 61 of an inner sleeve 60.

In some example embodiments, an outer box 20 can be assembled as follows. A front cover 30 can be assembled by folding panel 102' over panel 102, folding panel 102 about fold line T1 and folding panel 102" about fold line T6 such that panel 102" forms an L-shape with panel 102', and adhering panel 102" to panel 104; folding panel 112' over panel 112, folding panel 112 about fold line L1 and folding panel 112" about fold line L6 such that panel 112" forms an L-shape with panel 112', and adhering panel 112" to panel 104; and folding panel 114' over panel 114, folding panel 114 about fold line L2 and folding panel 114" about fold line L8 such that panel 114" forms an L-shape with panel 114', and adhering panel 114" to panel 104. A back cover 40 can be assembled by folding panel 110' over panel 110, folding panel 110 about fold line T4 and folding panel 110" about fold line T8 such that panel 110" forms an L-shape with panel 110', and adhering panel 110" to panel 108; folding panel 116' over panel 116, folding panel 116 about fold line L3 and folding panel 116" about fold line L10 such that panel 116" forms an L-shape with panel 116', and adhering panel 116" to panel 108; and folding panel 118' over panel 118, folding panel 118 about fold line L4 and folding panel 118" about fold line L12 such that panel 118" forms an L-shape with panel 118', and adhering panel 118" to panel 108. Fourth panel 108 can be folded about transverse fold line T3, flap F3 can be folded about the longitudinal fold line that separates it from bottom wall 21 and inserted between panels 116 and 116', flap F4 can be folded about the longitudinal fold line that separates it from bottom wall 21 and inserted between panels 118 and 118', and third panel 106 becomes a fourth sidewall of back cover 40 (in addition to sidewalls 46*a*, 46*b*, 46*c*), as well as acts as connecting bottom wall 21. The flaps F1, F2, F3, F4, F5, F6 can be folded and adhered to the sidewalls (in an example embodiment, flaps F1, F2 can be folded to be inserted between panels 102 and 102', flap F3 can be folded to be inserted between panels 116 and 116', flap F4 can be folded to be inserted between panels 118 and 118', and flaps F5, F6 can be folded to be inserted between panels 110 and 110') such that the front cover 30 can rotate about fold line T2 and the back cover 40 forms a rigid tray closed on four sides by the sidewalls 46*a*, 46*b*, 46*c*, and bottom wall 21 (panel 106).

In some example embodiments, an inner sleeve 60 can be assembled as follows. Flap 232 can be folded about fold line L9, and flap 234 can be folded about fold line L10, side portions of flap 232 can be folded about fold lines shown in dotted lines and side portions of flap 234 can be folded about fold lines shown in dotted lines, the panels 216, 218, 220, 222 can be folded about fold lines L1, L2, L3, L4, the panels 206, 210 can be folded about fold lines T3, T4, panels 216 and 220 can be adhered to each other, panels 218 and 222 can be adhered to each other, a rectangular portion of flap 232 can be adhered to panel 216 and/or panel 220, a rectangular portion of flap 234 can be adhered to panel 218 and/or panel 222, and/or side portions of flaps 232 and 234 can be adhered to panels 206 and 210 to form a bottom wall 61, front wall 62, back wall 63, and sidewalls 64, 65 of an inner sleeve 60. In some example embodiments, reinforcing straps 224, 226, 228, 230 can be folded about fold lines L5, L6, L7, L8 and adhered to panels 204, 212. In attaching the inner sleeve 60 to an outer box 20 of some example embodiments, panel 202 can be folded about fold line T1 and can be adhered to front wall 35 of front cover 30 of the outer box 20, and panel 214 can be folded about fold line T6 and can be adhered to back wall 45 of back cover 40 of the outer box 20, to thereby support the inner sleeve 60 inside the outer box 20 such that the inner sleeve 60 can move upwardly due to connecting panels 67, 68 (panels 204, 212) when the front cover 30 and back cover 40 are separated, and can move downwardly when the front cover 30 and back cover 40 are closed.

While the example embodiments described above have been exemplified with reference to the packaging of cigarettes, it will be appreciated that containers as described herein may also be advantageously employed to package a variety of other consumer goods such as, for example, other tobacco products, other nicotine products, cosmetics, confectionery products, foodstuffs, etc.

What is claimed is:

1. A pack for smoking articles, the pack comprising:
- an outer box including,
  - a front cover including a first sidewall,
  - a back cover including a second sidewall, less than or equal to about 75% of the first sidewall fitting within the second sidewall when the front cover is parallel with the back cover, and
  - a bottom cover connected to the front cover and the back cover such that the front cover and the back cover integrally define the outer box; and
- an inner sleeve including,
  - a bottom wall,
  - a front wall,
  - a back wall, and
  - a front connecting panel pivotally connecting the front wall and the front cover and a back connecting panel pivotally connecting the back wall and the back cover.

2. The pack of claim 1, wherein greater than or equal to about 25% of the first sidewall fits within the second sidewall.

3. The pack of claim 1, wherein the bottom cover is pivotably coupled to the front cover, the back cover, or both the front cover and the back cover.

4. The pack of claim 1, wherein the front cover has a first edge parallel with a second edge, the first edge of the front cover is coupled to the first sidewall, and a side edge of the first sidewall that is parallel with the first edge of the front cover is coupled to a third sidewall.

5. The pack of claim 4, wherein a top edge of the first sidewall is coupled to a fourth sidewall.

6. The pack of claim 5, wherein the fourth sidewall has one or more defining angles that are not ninety-degree angles.

7. The pack of claim 6, wherein
- the first sidewall has a first largest dimension, and
- the third sidewall has a second largest dimension that is less than the first largest dimension.

8. The pack of claim 7, wherein the third side wall includes one or more defining angles that are not ninety-degree angles.

9. The pack of claim 8, wherein an edge of the third sidewall that is parallel with the first edge of the front cover and the side edge of the first sidewall is coupled to a fifth sidewall.

10. The pack of claim 9, wherein the fifth sidewall has a third largest dimension that is less than the second largest dimension.

11. The pack of claim 10, wherein the fifth sidewall includes one or more defining angles that are not ninety-degree angles.

12. The pack of claim 1, wherein the back cover has a first edge parallel with a second edge, the first edge of the back cover is coupled to the first sidewall, and a side edge of the first sidewall that is parallel with the first edge of the back cover is coupled to a third sidewall.

13. The pack of claim 12, wherein the first sidewall has a first largest dimension, and the third sidewall has a second largest dimension that is less than the first largest dimension.

14. The pack of claim 12, wherein the third side wall includes one or more defining angles that are not ninety-degree angles.

15. The pack of claim 13, wherein an edge of the third sidewall that is parallel with the first edge of the back cover and the side edge of the first sidewall are coupled to a fourth sidewall.

16. The pack of claim 15, wherein the fourth sidewall has a third largest dimension that is less than the second largest dimension.

17. The pack of claim 15, wherein the fourth side wall includes one or more defining angles that are not ninety-degree angles.

18. The pack of claim 1, wherein the inner sleeve includes a third sidewall coupled to a first edge of one of the front wall and the back wall, the third sidewall including one or more defining angles that are not ninety-degree angles.

19. The pack of claim 18, wherein the inner sleeve includes a fourth sidewall coupled to a second edge of one of the front wall and the back wall, the fourth sidewall including one or more defining angles that are not ninety-degree angles.

20. The pack of claim 1, wherein the inner sleeve includes a fifth sidewall coupled to an edge of the bottom wall, the fifth sidewall including one or more defining angels that are not ninety-degree angles.

* * * * *